United States Patent [19]
Richter et al.

[11] B 3,925,694
[45] Dec. 9, 1975

[54] ARRANGEMENT FOR THE TRANSMISSION OF CONTROL COMMANDS FROM A STATIONARY PART TO A ROTATING PART OF AN ELECTRIC MACHINE

[75] Inventors: Martin Richter, Marloffstein; Ingo Kröger, Erlangen, both of Germany

[73] Assignee: Siemens Aktiengesellschaft, Munich, Germany

[22] Filed: Sept. 20, 1973

[21] Appl. No.: 399,349

[44] Published under the Trial Voluntary Protest Program on January 28, 1975 as document no. B 399,349.

[30] Foreign Application Priority Data
Sept. 21, 1972 Germany.......................... 2246424

[52] U.S. Cl....... 310/68 D; 310/DIG. 3; 322/DIG. 5
[51] Int. Cl.².......................................... H02k 11/00
[58] Field of Search..................... 310/DIG. 3, 68 D; 322/DIG. 5, 100; 307/278, 308, 309

[56] References Cited
UNITED STATES PATENTS
3,083,314  3/1963  Ratajski...................... 310/DIG. 3
3,165,685  1/1965  Manteuffel et al. .......... 310/DIG. 3

*Primary Examiner*—James D. Trammell
*Assistant Examiner*—Robert J. Hickey
*Attorney, Agent, or Firm*—Kenyon & Kenyon Reilly Carr & Chapin; Herbert Dubno

[57] ABSTRACT

An arrangement for the contactless transmission of control commands from a stationary part to a rotating part of an electrical machine in which a ring shaped signal receiving member coupled to the shaft of the machine has installed therein a plurality of Hall effect generators, which ring and Hall effect generators rotate within the gap of a stationary electromagnet to which is provided a control current, whereby the control current varies the magnetic field, which variation is picked up by the Hall effect generators, the resulting Hall generator voltages then amplified and provided to control elements within the rotating portion of the electric machine.

11 Claims, 3 Drawing Figures

ARRANGEMENT FOR THE TRANSMISSION OF CONTROL COMMANDS FROM A STATIONARY PART TO A ROTATING PART OF AN ELECTRIC MACHINE

BACKGROUND OF THE INVENTION

This invention relates to electric machines in general and more particularly to an improved arrangement of the contactless transmission of control commands from a stationary part to a rotating part of an electrical machine.

Difficulties arise in attempting to supply large power generators via slip rings. The power requirements may amount to several megawatts making this sort of transmission particularly troublesome. For this reason external pole exciter machines and rotating rectifiers for feeding have been employed. With advances in the state of the art and to improve the dynamic characteristics, the rectifiers formerly used for such applications have been replaced by rotating thyristors. In order to control the thyristors, which are rotating with the machine, from a stationary control point, a transmission arrangement is required which will insure interference free transmission without contact. Such an arrangement for transmitting the control signals should be designed so that it can be installed on the generator shaft without much difficulty and in addition in such a manner that generators can be retrofitted or modified to include such an arrangement. Since generators of this size have substantial longitudinal excursions, i.e., the range of 50 mm and radial play of the machine shaft in the order of ± 5 mm such an arrangement should operate reliably with such excursion present.

SUMMARY OF THE INVENTION

The arrangement of the present invention fills these needs and provides a contactless means of transmitting control signals from a stationary part to a rotating part in an electric machine. A ring shaped anti-magnetic signal receiving member is connected or arranged so that it can be coupled to the machine shaft. The ring contains around its circumference a plurality of Hall effect generators symmetrically spaced. A stationary electromagnet contains an air gap in which the ring shaped signal receiving member rotates. The electromagnet is fed from a co-rotating current source and provides the control current for the Hall effect generators. A transmitting station is included to provide the necessary control of the electromagnet current. The resulting Hall generator voltages are amplified in amplifiers also installed on the generator shaft and rotating therewith, the outputs of which are then provided to the elements within the machine which are to be controlled. The Hall effect generators are held between grooves formed in the cylindrical inside and outside surfaces of the signal receiving means. Associated with each Hall effect generator are two collectors of mu metal which fill part of the circular grooves and whose free ends are separated by an air gap from the collectors associated with the next Hall effect generator. Preferably the collector strips will be laminated or consists of sections of mu metal wire cast into the circular grooves. The signal receiving member may comprise an aluminum or brass ring with a T or L shaped profile. The control commands for the control elements to be controlled, which rotate with the machine shaft, are taken from a signal transmitter which feeds the stationary electromagnet thereby establishing the magnetic field for the Hall effect generator. The signal is fed from the signal transmittor through a modulator and power amplifier. The Hall generator voltages delivered by each of the Hall effect generators in reponse to the magnetic control field is then provided through separate amplifiers to a common summing amplifier and then through a demodulator to the control set for the control elements being controlled. A control voltage supply is provided for the Hall effect generators with all of the generators connected in series with the voltage supply.

DETAILED DESCRIPTION OF THE PREFERRED EMBODIMENT

Figure 1:
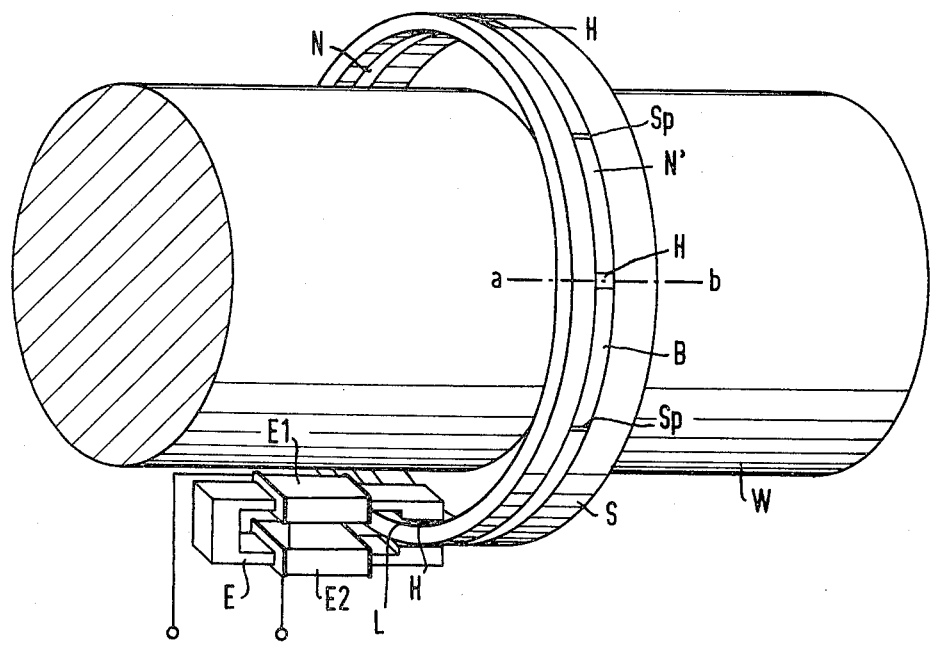
FIG. 1 is a perspective view showing the stationary electromagnet and rotating signal receiving member of the present invention.

FIG. 1 is a perspective view illustrating the stationary electromagnet E and the signal receiving member S which rotates with the machine shaft W. The ring shaped signal receiving member S will have a T or L shaped profile. As illustrated on FIG. 2 it is shown as having an L shaped profile. The ring shaped member S will be formed of a non-magnetic material such as aluminum or brass. As illustrated, the ring S rotates within the air gap L of the eletromagnet E. Electromagnet E has two windings designated $E_1$ and $E_2$ wound thereon to which current is supplied in a controlled manner as will be described below to establish the magnetic field in the air gap L.

Figure 2:
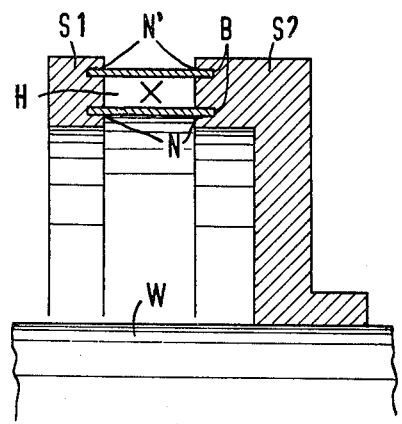
FIG. 2 is a cross-sectional view through the receiving member of FIG. 1.

As illustrated by FIG. 2, the circular ring shaped receiving member S is formed of two portions, $S_1$ and $S_2$. The sections $S_1$ and $S_2$ each contain grooves N toward the inside and N' toward the outside. Extending between these grooves are collector strips B of mu metal. Held between the collector strips B are a plurality of Hall effect generators H. The number of Hall effect generators which will be at least two and will be normally be four or more. The number used will depend on the particular machine involved. Each of the Hall effect generators will intersect the magnetic field in the air gap L once per revolution of the shaft W. As shown, the air gap is established between each of the Hall effect generators and their associated mu metal strips B indicated by the reference symbol Sp. The Hall effect generators H and their mu metal strips B with which they are in contact, will convert the information in the magnetic field established in the air gap L to a Hall effect voltage in conventional fashion. The Hall effect voltages are then amplified and serve to provide the control elements in the machine a representations of the control command which was impressed upon the electromagent E. In this manner the firing angle of the thyristors on the rotor of the machine to be controlled can be established.

Figure 3:
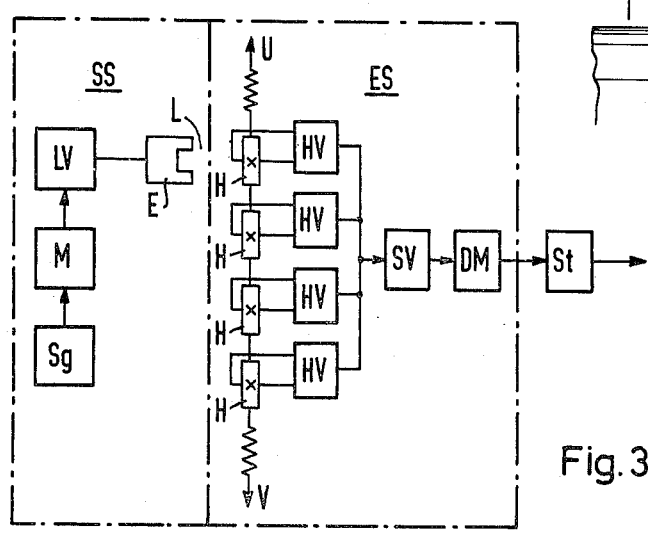
FIG. 3 is a block-circuit diagram of the elements of the present invention.

FIG. 3 is a block-circuit diagram illustrating the various elements of the present system. Such a system may be used up to a frequency range of approximately 30 KHz. Information from a stationary signal transmitter Sg is provided to the electromagnet E through a modulator M and a power amplifier LV. These elements together comprise a transmitting station SS. The information transmitted by the transmitting station SS is processed using the frequency-multiplex or time-multiplex method and fed through the electromagnet E to what is generally designated as a receiving station ES. The control command from the signal transmittor SG is first modulated in the modulator M and then amplified in a power amplfier LV the output of which is used to drive the electromagnet E. The magnetic field which is developed in the air gap L of the stationary electromagnet corresponds to the control command and acts upon the collector strips B and Hall effect generator as described above in connection with FIGS. 1 and 2. The control current for the Hall effect generators is provided from positive and negative sources U and V through current controlling resistors to all of the Hall effect generators connected in series as shown. In the illustrated embodiment four Hall effect generators are shown. However, as noted above, more or less may be used depending upon the particular generator. The voltage sources U and V are mounted to the shaft of the machine and rotate therewith. Each of the Hall effect generators H has associated therewith a Hall voltage amplifier HV which amplifies the output voltage of its respective Hall effect generator. The outputs are then provided to a common summing amplifier SV. The output of the amplifier SV is demodulated in a demodulator DM and is then fed through a control set ST of the control elements to be controlled, i.e., the thyristors.

The signal receiving member S, i.e., the receiver ring, preferably will be made in two sections in order to make it possible to retrofit an electrical machine to have the type of contactless transmission means described above. The width L of the air gap between the pole pieces of electromagnet E should be selected to take into account the radial play of the shaft W. Similarly the length of the legs of the electromagnet E and/or the length of its pole pieces should be selected to match the longitudinal excursion expected in the shaft W.

In order to reduce the magnetic resistance of the mu metal strips B shown on FIGS. 1 and 2, a well annealed metal with a large magnetic cross section should be used. The eddy current losses which occur at high transmission frequencies may be kept small by using thin mu metal strips and laminating them together. Optionally, sections of mu metal wire can be provided which are cast into the circular grooves N and N. It is advisable to cast the mu metal strips in, or place casting material over the strips, using a setting plastic. This will hold the Hall effect generators rigidly in place and resist the large centrifugal forces which are developed at high speeds of rotation of shaft W. The various building blocks of the receiving station ES like the power supply U-V will be mounted at or in the shaft W for rotation therewith.

Thus an improved system for contactless transmission of control commands from a stationary part to a rotating part of an electric machine has been shown. Although a specific embodiment has been illustrated and described it will be obvious to those skilled in the art that various modifications may be made without departing from the spirit of the invention which is intended to be limited solely by the appended claims.

What is claimed:

1. Apparatus for the contactless transmission of control commands from a stationary part to a rotating part of an electric machine, which machine is controlled through the use of rotating thyristors comprising:
   a. a ring shaped anti-magnetic signal receiving member adapted to be coupled to the machine shaft and having installed, at the circumference of the ring, a plurality of Hall effect generators;
   b. a stationary electromagnet having poles forming an air gap located so that said signal receiving member will rotate therein; and
   c. means to provide a control signal to said electromagnet.

2. The invention according to claim 1 wherein said electric machine is a synchronous generator without slip rings and with an external pole exciter.

3. The invention according to claim 1 wherein said electromagnet is fed with a control current from a co-rotating current source.

4. The invention according to claim 3 wherein a control signal transmitter is coupled to said electromagnet to develop in the air gap a magnetic field for the Hall effect generators and wherein the resulting Hall generator voltages developed are coupled through amplifiers mounted for rotation with the shaft to control means for the control elements to be controlled.

5. The invention according to claim 1 wherein each the Hall effect generators is contained between two collector strips of mu metal inserted in upper and lower circular grooves in said ring shaped signal receiving member with an air gap established between each Hall effect generator and its associated collector strips and those of adjacent Hall effect generators and collector strips.

6. The invention according to claim 5 wherein said collector strips are laminated.

7. The invention according to claim 5 wherein said collector strips comprise sections of wires cast into the circular grooves.

8. The invention according to claim 1 wherein said signal receiving member is made of one of brass and aluminum and has one of a T and L shaped profile.

9. The invention according to claim 1 wherein the control command for the control elements to be controlled is provided from a signal transmitter which is coupled through a modulator and power amplifier to said stationary electromagnet to thereby establish the magnetic field in which the Hall effect generators operate.

10. The invention according to claim 1 wherein the Hall voltage outputs developed by each of said plurality of Hall effect generators is provided through an amplifier to a common summing amplifier, and further including a demodulator coupled to the output of said summing amplifier said demodulator providing its output to a control set for controlling the control elements.

11. The invention according to claim 1 wherein said Hall effect generators are connected in series with each other and a control voltage supply.

* * * * *